United States Patent [19]

Richter et al.

[11] Patent Number: 5,290,453
[45] Date of Patent: Mar. 1, 1994

[54] PROCESS FOR PREPARING CHELATING ION EXCHANGER RESINS AND THE USE THEREOF FOR THE EXTRACTION OF METALS

[75] Inventors: Michael Richter, Unna; Oliver Schumacher, Werne, both of Fed. Rep. of Germany

[73] Assignee: Schering Aktiengesellschaft, Bergkamen, Fed. Rep. of Germany

[21] Appl. No.: 916,095

[22] PCT Filed: Mar. 13, 1991

[86] PCT No.: PCT/EP91/00467
§ 371 Date: Jul. 28, 1992
§ 102(e) Date: Jul. 28, 1992

[87] PCT Pub. No.: WO91/16972
PCT Pub. Date: Nov. 14, 1991

[30] Foreign Application Priority Data

Apr. 27, 1990 [DE] Fed. Rep. of Germany ....... 4014015

[51] Int. Cl.$^5$ ............................................. C02F 1/42
[52] U.S. Cl. ..................... 210/688; 210/681; 210/660; 521/31
[58] Field of Search ............ 210/688, 681, 660; 521/31, 38

[56] References Cited

U.S. PATENT DOCUMENTS

| | | | |
|---|---|---|---|
| 3,882,053 | 5/1975 | Corte et al. | 260/2.1 E |
| 3,989,650 | 11/1976 | Lange et al. | 260/2.1 E |
| 4,002,564 | 1/1977 | Carbonel et al. | 210/688 |
| 4,317,887 | 3/1982 | Warshawsky et al. | 521/38 |
| 4,389,379 | 6/1983 | Bauer et al. | 423/89 |
| 4,468,374 | 8/1984 | Kataoka et al. | 423/112 |
| 4,500,494 | 2/1985 | Scher | 210/688 |
| 4,631,177 | 12/1986 | Yotsuyanagi et al. | 423/112 |
| 4,724,129 | 2/1988 | Helgorsky et al. | 423/112 |

FOREIGN PATENT DOCUMENTS 407922 10/1973 U.S.S.R.

OTHER PUBLICATIONS

Chemical Abstract 84:1841r (Jan. 1976) of V. Balakin et al., *Izu. Vyssh. Uchebn. Zaved., Khim. Khim.*, 18 (9), 1466–1469 (1975).
A. Warshawsky et al., Reactive Polymers, 2, 301–314 (1984).
Chemical Abstract 85:124753x of V. Balakin, *Tezisy Dokl. Simp. Khim. Tekhnol. Getrotsikl. Soedin. Goryuch. Iskup.*, 2nd, 134–135 (1973).
Parrish, *Chem. Ind.*, 137 (Feb., 1956).
P. Burba et al., *Die Angewandte Makromolekulare Chemie*, 50, 151–161 (1976).
Z. Slovak et al., *Analytica Chemica Acta.*, 75, 127–138 (1975).

Primary Examiner—Stanley S. Silverman
Assistant Examiner—Cynthia L. Nessler
Attorney, Agent, or Firm—Scully, Scott, Murphy & Presser

[57] ABSTRACT

The invention relates to a process for preparing complex-forming ion exchanger resins which contain 8-hydroxyquinoline groups and can be prepared from carrier materials containing amino groups reactive with aldehydes, and aldehydes, 8-hydroxyquinoline and/or 8-hydroxyquinoline derivatives, and to the use thereof for the selective extraction of metals from aqueous solutions.

10 Claims, 4 Drawing Sheets

PROCESS FOR PREPARING CHELATING ION EXCHANGER RESINS AND THE USE THEREOF FOR THE EXTRACTION OF METALS

In recent years, the extraction of metals from aqueous solutions has gained increasing importance. Thus, the statutorily permissible maximum limits, especially for objectional metals in effluents, make it absolutely necessary to separate off these metals.

Moreover, the removal of interfering metals has a positive effect on numerous industrial processes such as, for example, electrolytic processes.

For the recovery of metals, extraction processes have recently increasingly displaced other methods, because they combine the advantages of high selectivity and good economics and permit metal recovery from highly dilute solutions.

Thus, solvent extraction with liquid extractants (liquid/liquid extraction) is an established method and is employed for the recovery of numerous metals.

The liquid extractants used are, inter alia, water-insoluble 7-alkyl-8-hydroxyquinoline derivatives such as, e.g., KELEX ® 100 (registered trademark of Schering AG) for the selective extraction of, for example, germanium and gallium (cf. EP-A-46,437; U.S. Pat. No. 4,724,129).

In liquid/liquid extraction, a certain loss of extractants and also additionally of used organic solvents as a result of the process is unavoidable, which is a disadvantage for both ecological and economic reasons.

There has therefore been no lack of attempts in the past to minimize these losses.

In U.S. Pat. No. 4,631,177, a process is described according to which the liquid extractants are physically adsorbed on solid carrier materials such as adsorber resins/ A certain progress was achieved by this measure. In long-term operation, however, it was found that this physical fixing of the extractants on the resins was not firm enough and consequently washing-out losses arose, which led to a deterioration in the extraction properties (loading capacity).

It was therefore proposed to fix the extractants on the carrier materials by stable chemical bonds.

Thus, it is proposed by J. R. Parrish, Chem. Ind., London 1956, 137, to bind 8-hydroxyquinoline chemically to styrene resin via azo groups. These resins proved to be relatively slow in absorbing metals and their loading capacity is also low. They were therefore able to gain as little acceptance in practice as products in which 8-hydroxyquinoline or derivatives thereof were bound via azo groups to other carrier materials (P. Burba, K. H. Lieser, Angewandte Makromolekulare Chemie, 50 (1976) 151–161; Z. Slovák, S. Slováková, M. Smrz, Analytica Chimica Acta, 75 (1975), 127–138). A. Warshawsky et al. (U.S. Pat. No. 4,317,887) propose, inter alia, to bind 8-hydroxyquinoline via 5—$CH_2$—N—H—$CH_2$— groups or via 5—$CH_2$—NH—($CH_2$—$CH_2$—NH)$_n$—$CH_2$— groups to the particular carrier resins. These syntheses start from 5-chloromethylated 8-hydroxyquinolines, which are highly sensitive to hydrolysis. Because of the necessary use in their synthesis of hydrochloric acid or chlorinating agents which release hydrochloric acid, expensive corrosion-resistance special apparatus is necessary.

Moreover, highly toxic bis-(dichloromethyl) ether can be formed as a by-product in the preparation of the 5-chloromethyl-8-hydroxyquinolines.

In USSR Patent Specification 407,922, a process for the preparation of complex-forming ion exchangers containing 8-hydroxyquinoline groups is described which is characterized in that polymers containing primary and/or secondary amino groups and having a three-dimensional structure are reacted with 8-hydroxyquinoline and formaldehyde.

Reaction products of amines and epichlorohydrin and in addition also products of the amination of chloromethylated styrene/divinylbenzene copolymers are proposed as the polymers containing primary and/or secondary amino groups.

Although the reaction products of the amine/epichlorohydrin reaction products with formaldehyde and 8-hydroxyquinoline show an improved sorption capacity, they do not yet meet the requirements in practice with regard to the mechanical, physical and chemical stresses during the extraction process. Moreover, the macroporous beads of defined size and pore size distribution which are preferred in practice cannot be reproducibly prepared in this way.

Although the reaction products of aminomethyl-substituted styrene/divinylbenzene copolymers—prepared from the chloromethyl copolymers—with formaldehyde and 8-hydroxyquinoline show an adequate mechanical, physical and chemical stability, they do not have a satisfactory sorption capacity.

It is the object of the present invention to provide complex-forming ion exchanger resins which contain 8-hydroxyquinoline groups and which, in addition to excellent resistance to the stresses of the extraction process, simultaneously show outstanding sorption capacity for a large number of metals.

This object is achieved by reacting 8-hydroxyquinoline or 8-hydroxyquinoline derivatives with aldehydes and carrier materials prepared by certain processes and containing aminoalkyl groups.

A subject of the invention is therefore a process for preparing ion exchanger resins, in which
a) carrier materials which contain NH and/or $NH_2$ groups reactive with aldehydes are reacted with
b) aldehydes and
c) 8-hydroxyquinoline and/or 8-hydroxyquinoline derivatives and, if appropriate,
d) swelling agents and/or solvents
mixed with one another at temperatures between 20° and 100° C., preferably 50°–70° C., and the reaction product is washed with water or solvents, if appropriate with additional use of acids or bases, characterized in that gel-type or macroporous crosslinked polystyrene copolymers which contain aminoalkyl groups and which can be prepared by imidoalkylation of crosslinked styrene copolymers with esters or ethers of N-hydroxylalkylimides and subsequent hydrolysis of the imidoalkylation products, are used as the carrier materials.

BRIEF DESCRIPTION OF THE DRAWINGS

The present invention may be better understood with reference to the following drawings of which.

Figure 1A:
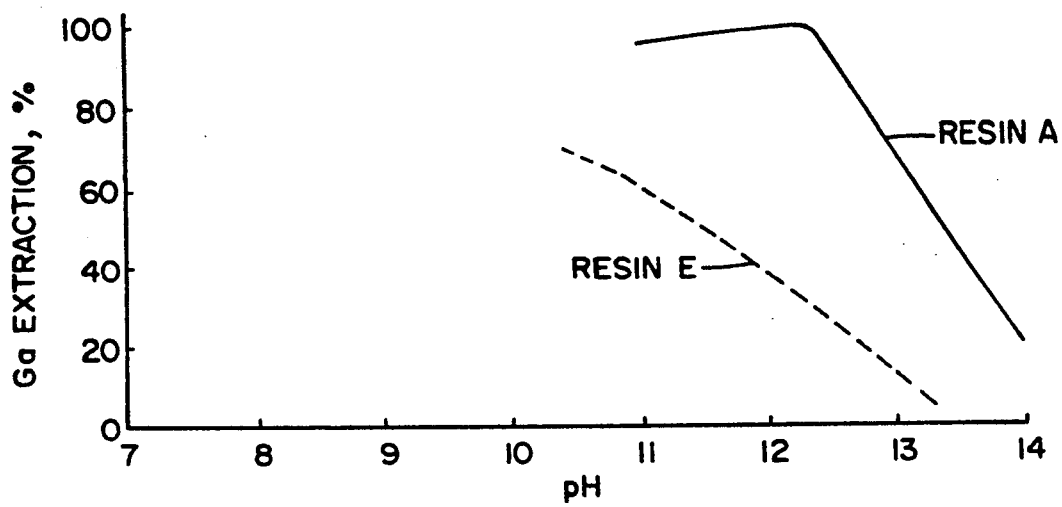
FIG. 1a is a graphical representation of an experiment, conducted in accordance with Example 7, wherein gallium extraction, employing ion exchange resin A of the present invention and resin E of the prior art, is depicted as a function of pH.
Figure 1B:
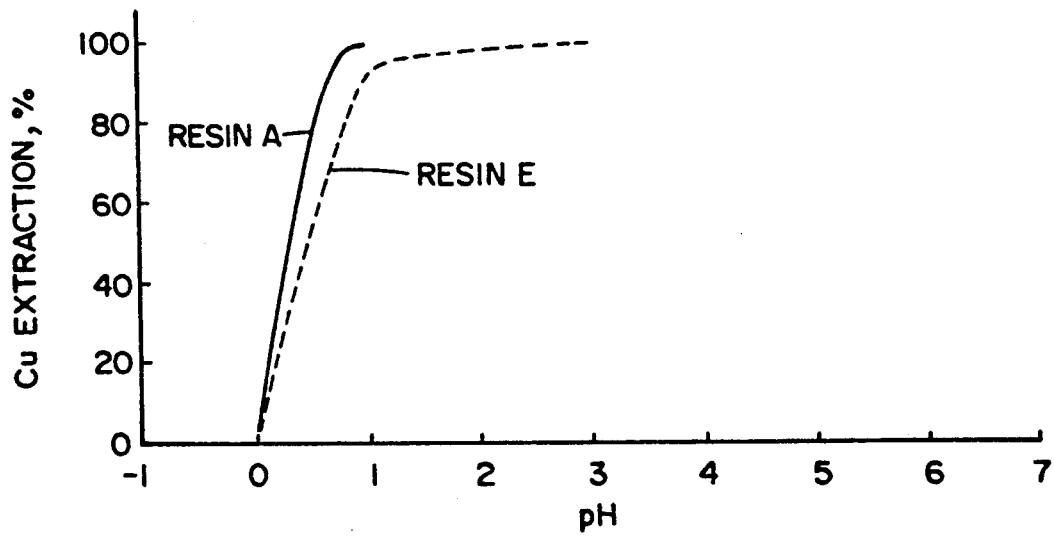
FIG. 1b is identical to FIG. 1a except that copper extraction, rather than gallium extraction, is depicted.
Figure 1C:
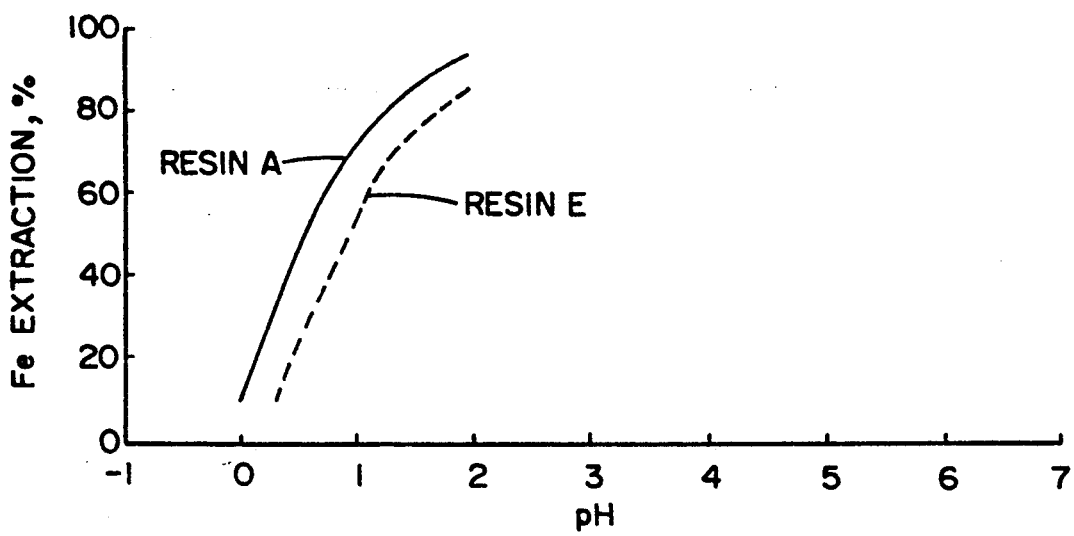
FIG. 1c is identical to FIG. 1a except that iron extraction, rather than gallium extraction, is depicted.
Figure 1D:
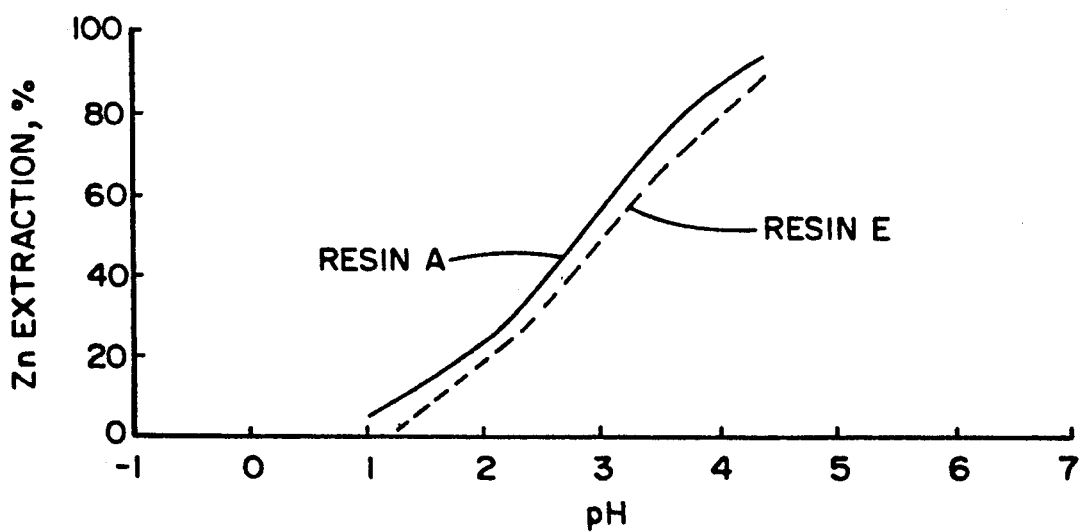
FIG. 1d is identical to FIG. 1a except that zinc extraction, rather than gallium extraction, is depicted.
Figure 1E:
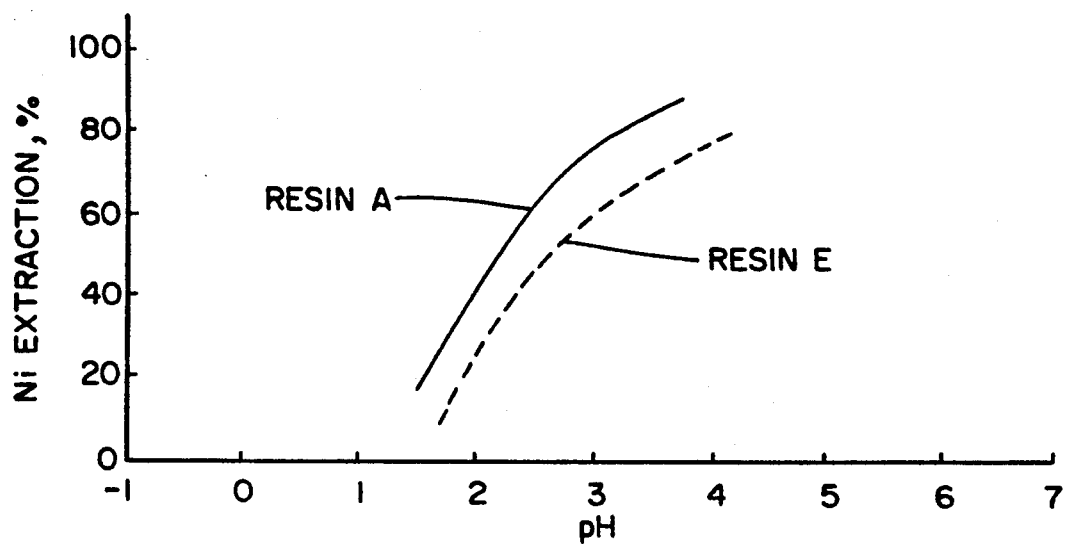
FIG. 1e is identical to FIG. 1a except that nickel extraction, rather than gallium extraction, is depicted.

Preferably, the carrier materials contain at least one reactive group of the general formula

$$-(CH_2)_n-NH-R^1 \qquad (I)$$

wherein $R^1$ = H or an optionally substituted, optionally unsaturated alkyl, cycloalkyl or alicyclic radical having 1 to 10 C atoms—preferably methyl—or an optionally substituted aromatic radical having 6–10 C atoms and n = 1 or 2.

Carrier materials wherein $R^1$ = H and n = 1 are very particularly preferred according to the invention. Macroporous aminomethylated styrene/divinylbenzene copolymer is used as the preferred carrier material.

The aldehydes used are preferably those of the general formula II

$$R^3-C\overset{\displaystyle O}{\underset{\displaystyle H}{\diagdown}} \qquad (II)$$

wherein $R^3$ is a hydrogen, an alkyl radical having 1–4 and especially 1–2 C atoms or an optionally substituted aromatic hydrocarbon radical having 6–10 C atoms.

Formaldehyde is particularly preferred

Water and/or methanol and/or ethanol are used as preferred swelling agents and/or solvents.

A further subject of the invention are complex-forming ion exchangers which can be prepared by reacting
a) carrier materials which can be prepared by amidoalkylation, preferably by imidoalkylation, of crosslinked styrene copolymers with esters or ethers or N-hydroxyalkylimides and subsequent hydrolysis of the imidoalkylation products, and which contain aminoalkyl groups reactive with aldehydes, with
b) aldehydes and
c) 8-hydroxyquinoline and/or 8-hydroxyquinoline derivatives and, if appropriate,
d) swelling agents and/or solvents.

A further subject of the invention is the use of the complex-forming ion exchangers prepared according to the invention for the extraction of metals, in particular of platinum and palladium.

The carrier materials to be used according to the invention are crosslinked styrene copolymers having reactive aminoalkyl groups.

These carrier materials can be prepared by a Friedel-Crafts reaction of crosslinked, water-insoluble organic polymers containing aromatic nuclei with imidoalkylating agents in the presence of swelling agents for the polymer and acid catalysts, and subsequent saponification of the imidoalkylated polymers in accordance with German Patent Specifications 2,161,628 and 2,418,976.

The esters of the N-hydroxyalkylimides with lower aliphatic carboxylic acids (German Patent Specification 2,418,976) and bis-(dicarboximidoalkyl) ethers (German Patent Specification 2,161,628) can be used as the amidoalkylating agents.

The N-hydroalkylimides which can be used are dimethylimides and di-ethylimides of aliphatic $C_4$–$C_6$-dicarboxylic acids and also aromatic o-dicarboxylic acids.

According to the invention, the N-hydroxymethylimides are preferably employed. The crosslinked, water-insoluble, organic polymers containing aromatic nuclei are preferably vinylaromatic compounds such as are obtained in the copolymerization of monovinyl and polyvinyl compounds. Such copolymers are known and are obtained in a known manner. The copolymers can be microporous, that is to say they have a gel structure, or macroporous.

Those copolymers are preferred which are built up from a predominant proportion of monovinyl-aromatic compounds and a small proportion of aromatic or aliphatic polyvinyl compounds.

The swelling agents which can be used for the polymer are above all halogenated hydrocarbons or polar organic solvents such as nitro compounds.

The usual Friedel-Crafts catalysts such as $AlCl_3$ or $FeCl_3$ and especially sulfuric acid are employed as the acid catalysts.

The reaction of the organic polymers with the esters of the N-hydroxyalkylimides is carried out at temperatures of 0°–150° C. The esters are employed here in such quantities that there are 0.5–4 moles of ester in the polymer per mole of aromatic nuclei. The catalysts used are in general added in quantities of 0.1–1.5 moles per mole of ester.

The reaction can be carried out in such a way that the esters of the N-hydroxyalkylimides are first prepared in the swelling agents and the polymers are swollen into these solutions. After the acid catalysts have been added, the reaction is carried out at the requisite reaction temperature. After the acylimidoalkylation, the acyl radical is eliminated from the reaction products in a known manner by alkaline or acidic hydrolysis of the acylimidoalkylation products.

The carrier materials preferably employed according to the invention are macroporous aminomethyl-polystyrene/divinylbenzene resins having nitrogen contents of 8–12 percent by weight in the dry matter with degrees of crosslinking of 2–12%, preferably 4–8%, and useful capacities of 1.5–3.5 equivalents/l, preferably 2.5–3 equivalents/l according to German Patent Specification 2,418,976.

The macroporous resins must have a sufficient pore size for permitting both the penetration of water and/or solvent, 8-hydroxyquinolines and aldehydes and the later complexing with metal ions.

The aldehydes used according to the invention are those which are capable of undergoing a Mannich reaction (aminomethylation) with the amino groups of the carrier material and 8-hydroxyquinolines according to formula III.

These are aldehydes of the general formula II

wherein $R^3$ denotes a hydrogen, an alkyl radical having 1–4 and especially 1–2 C atoms or an optionally substituted aromatic hydrocarbon radical having 6–10 C atoms, such as propionaldehyde, butyraldehyde, isobutyraldehyde, especially formaldehyde, acetaldehyde and benzaldehyde. The 8-hydroxyquinolines which are chemically bound to the carrier material via the aldehydes are those of the general formula III

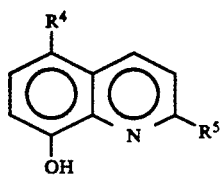

III wherein $R^4$=H or halogen atom or —$SO_3H$ and $R^5$=H or $CH_3$. Compounds with $R^4$=H or chlorine and $R^5$=H are preferred according to the invention.

According to the invention, water and $C_1$–$C_4$-especially methanol or ethanol, if appropriate with additional use of acids or bases, can be employed as the swelling agents and/or solvents.

The carrier materials (M) containing amino groups are reacted with aldehydes and 8-hydroxyquinoline (derivatives) under conditions known per se in a Mannich reaction:

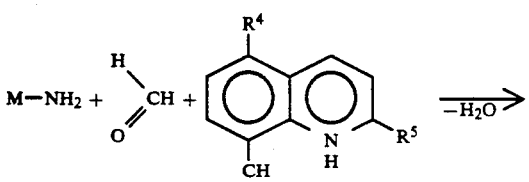

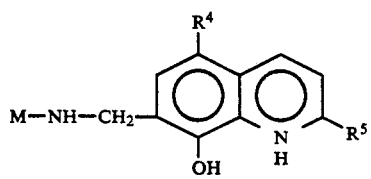

The aminomethylation of 8-hydroxyquinolines according to formula III takes place in the 7-position under the reaction conditions indicated.

The reaction conditions for Mannich reactions are generally known and are also adhered to for the linking according to the invention of the 8-hydroxyquinolines to the carrier materials.

The reaction can be carried out in such a way that all the components are put together with stirring at room temperature or reaction temperature or that one or two components are introduced first and the remaining components are added at room temperature or reaction temperature.

Preferably, the carrier material is allowed to swell in a solvent or solvent mixture before the reaction.

Depending on the type of the components, the reaction temperatures can be between 20° and 100° C., preferably between 20° and 80° C. and especially between 50° and 70° C. The reaction times here can be up to 48 hours, but as a rule they are between 5 and 24 hours.

The molar aldehyde: 8-hydroxyquinoline derivative ratio can be varied between 2:1 and 1:1, but is preferably in the range around 1–1.5:1. Although molar ratios above 2:1 are possible, they are hardly sensible in process economy terms. The quantities of aldehyde and 8-hydroxyquinoline derivative depend on the accessible reactive amino groups on the carrier material and are preferably employed in such quantities that all the amino groups accessible to the Mannich reaction can be converted. In practice, an amino group:8-hydroxyquinoline ratio in the range from 1:1 to 1:1.5 will therefore be sufficient.

After completion of the reaction, the resin is isolated and washed with water, if appropriate with the additional use of bases or acids and/or solvents. The resin thus freed from unconverted soluble reaction components can be used directly for the extraction process.

The resins prepared according to the invention are stable over a wide range of temperature and pH, have a pronounced hydrophilic character and water swell-temperature. ability, show good kinetics and capacity for the metal absorption and can therefore be successfully used for extraction processes.

In the latter, the resins are contacted in a manner known per se in columns or stirred vessels with aqueous metal salt solutions of suitable pH value and/or suitable ion concentration.

The re-extraction of the metals bound by the resins is effected by contacting with aqueous solutions analogously to the corresponding solvent extraction processes.

The resins prepared according to the invention can successfully be employed for the selective recovery of rare metals such as platinum or palladium, and also for the isolation or recovery of copper, antimony, molybdenum, zinc, nickel, cobalt, gallium, germanium, indium, bismuth, vanadium, selenium and tellurium.

EXAMPLES

The aminomethylated styrene/divinylbenzene copolymers also used according to the invention were prepared analogously to German Patent Specification 2,418,976, Example 2, as described below for resin I:

354 g of N-hydroxymethylphthalimide, dissolved in 110 g of dichloroethane, were heated for 5 hours under reflux with 227 g of acetic anhydride. 150 g of a macroporous styrene bead polymer crosslinked with 6% of divinylbenzene were swollen for 1 hour at 60° C. into this ester solution. 240 g of concentrated sulfuric acid were then added dropwise at reflux temperature within the course of one hour and the reaction mixture was stirred for a further 20 hours at the same temperature. After the reaction product had been separated off, the latter was suspended in 1000 ml of 10% aqueous ammonia solution The residues of dichloroethane were removed from this suspension by azeotropic distillation.

The reaction product was then separated off and saponified with 40% sodium hydroxide solution by heating in an autoclave at 180° C. for 10 hours. After filtering off and washing out, the aminomethyl-polystyrene/divinylbenzene resin I was obtained.

Properties: see Table 1.

Resins II–IV (see Table 1) were prepared analogously.

TABLE 1

| Resin | N-content* in dry matter % | Cross-linking % | Capacity** equiva-lents/l | type |
|---|---|---|---|---|
| I | 11.1 | 6 | 3.0 | macroporous |
| II | 8.9 | 8 | 2.6 | macroporous |
| III | 8.8 | 5 | 2.4 | macroporous |
| IV | 9.1 | 4 | 2.8 | gel-type |

*according to elemental analysis
**The figure refers to water-moist resin (see DIN 54 402, DIN 54 408, DIN 54 400)

For the comparison examples, a commercially available amination product of chloromethylated macroporous polystyrene/divinylbenzene resin having a nitrogen content of 6.3% was used.

Example 1

314 g of water-moist aminomethyl-polystyrene/divinylbenzene resin I (corresponding to 100.0 g of dry matter), 165 g of 8-hydroxyquinoline and 470 ml of methanol were stirred for 1.5 hours at 60° C. 50.5 g of p-formaldehyde were added thereto and stirring was continued for 5 hours at 60° C. The resin was filtered off. To remove adhering impurities, it was washed: successively with about 300 ml in each case of methanol, water, 4N $H_2SO_4$, water, 1.5N NaOH and finally with water until the run-off showed a neutral reaction.

Yield of moist resin: 350.6 g, corresponding to 201 g of dry resin matter. Calculated 8-hydroxyquinoline content: 3.2 moles per kg of dry resin matter (compare Table 2, resin A).

To determine the water content, 10.0 g of moist resin were dried to constant weight in a circulating-air drying cabinet at 50° C. and weighed again. Water content determined: 42.7%.

Example 2

In the same way as described in Example 1, aminomethyl-polystyrene/divinylbenzene resin I was reacted in varying reactant ratios, solvents and for different reaction times. Table 2 shows the results of resins Aa–Ad.

TABLE 2

| Product | A | Aa | Ab | Ac | Ad |
|---|---|---|---|---|---|
| g of 8-hydroxyquinoline | 165 | 165 | 165 | 96 | 165 |
| g of p-formaldehyde | 50.5 | 50.5 | 37 | 20 | 50.5 |
| Solvent | $CH_3OH$ | $CH_3OH$ | $CH_3OH$ | $CH_3OH$ | $C_2H_5OH$ |
| Reaction time in hours | 5 | 24 | 24 | 5 | 5 |
| Yield in g of dry matter | 201 | 214 | 192 | 155 | 186 |
| Water content of the product % | 42.7 | 38.6 | 44.2 | 48.3 | 42.8 |
| Weight per liter in g/ml* | 0.81 | 0.81 | 0.80 | 0.79 | 0.80 |
| Content $\frac{\text{moles of 8-hydroxyquinoline}}{\text{kg of dry product}}$ | 3.2 | 3.4 | 3.1 | 2.3 | 3.0 |

*analogously to DIN 54408

Example 3

The aminomethyl-polystyrene/divinylbenzene resins II–IV and the comparison resin mentioned were reacted in the same way as described in Example 1.

Table 3 shows the results of the resins A–E.

TABLE 3

| | Examples (according to the invention) | | | | Comparison example |
|---|---|---|---|---|---|
| Product | A | B | C | D | E |
| Resin starting material | I | II | III | IV | commercially available macroporous aminomethyl-polystyrene/divinylbenzene |
| g of 8-hydroxyquinoline | 165 | 165 | 165 | 165 | 160 |
| g of formaldehyde | 50.5 | 50.5 | 50.5 | 50.5 | 33 |
| Solvent | $CH_3OH$ | $CH_3OH$ | $CH_3OH$ | $CH_3OH$ | $C_2H_5OH$ |
| Reaction time in hours | 5 | 5 | 5 | 5 | 40 |
| Yield in g of dry matter | 201 | 147 | 171 | 213 | 131 |
| Water content of the product % | 42.7 | 46.4 | 38.3 | 30 | 58.3 |
| Weight per liter in g/ml* | 0.81 | 0.77 | 0.78 | 0.87 | 0.75 |
| Content $\frac{\text{moles of 8-hydroxyquinoline}}{\text{kg of dry product}}$ | 3.2 | 2.0 | 2.6 | 3.4 | 1.5 |

*analogously to DIN 54408

Example 4

The extraction of metal ions from aqueous solutions by means of the resins according to the invention was carried out in the following examples:

The copper extraction from acidic solution was measured in the following experimental arrangement:

The quantity of moist resin corresponding to 5 g of dry resin matter was covered in a beaker with a layer of 4N $H_2SO_4$. After 3 minutes, the resin was filtered off, washed until neutral with 2 l of water and transferred into a round-bottomed flask.

110 ml of a copper sulfate solution (6 g/l of $Cu^{2+}$) were added and the solution was adjusted with $H_2SO_4$ to pH 2 or with acetate buffer to pH 4. The suspension was stirred for 24 hours. The $Cu^{2+}$ content of the solution before the addition of resin and after the loading had taken place was determined in the known manner by titration. The difference and the volume of the resin employed give the Cu loading in g of $Cu^{2+}$/l of resin. Table 4 shows the results.

TABLE 4

| Resins (according to the invention) | Cu loading in g of Cu/l of resin at | |
|---|---|---|
| | pH 2 | pH 4 |
| A | 43.7 | 51.2 |
| Aa | | 59.0 |
| Ab | | 49.5 |
| Ac | | 38.1 |

TABLE 4-continued

| Resins (according to the invention) | Cu loading in g of Cu/l of resin at | |
|---|---|---|
| | pH 2 | pH 4 |
| A | d | 48.3 |
| B | 32.8 | 39.0 |
| C | 41.8 | 49.0 |
| D | 15.2 | 3.1 |
| Comparison Example E | 14.0 | |

Example 5

4 different methods were applied for measuring further metal loadings:

Method a

The quantity of moist resin corresponding to 5 g of dry resin matter was treated as described in Example 4. After the neutral washing, the resin was washed with solution 1. The loading took place with 110 ml of a solution of the metal (6 g/l of metal ions in solution 1). The metal content of the solutions was determined by titration in the known manner or by an atomic absorption spectroscopy measurement.

If the metal quantity employed according to method a is not sufficient for saturation of the resin with metal, method b or c is used.

Method b

The procedure described under method a was followed, but the volume of the metal solution was doubled from 110 to 220 ml.

Method c

The procedure described under method a was followed, but the volume of the metal solution was increased from 110 to 440 ml.

In the case of particularly expensive metals, the measurement was carried out according to method d.

Method d

The procedure followed was as described under method a, but a quantity of resin was employed which corresponds to 0.2 g of dry matter, and a solution of 1 m-equivalent of metal in 50 ml of solution 1 was employed.

Tables 5, 5a and 5b show the results.

TABLE 5

| | Metal | | | | | | | | | | | | |
|---|---|---|---|---|---|---|---|---|---|---|---|---|---|
| | $Se^{4+}$ | $Sb^{3/5+}$ | $Bi^{3+}$ | $Ge^{4+}$ | $Sn^{4+}$ | $Ga^{3+}$ (1) | $Ga^{3+}$ (2) | $In^{3+}$ | $Tl^{3+}$ | $Pd^{2+}$ | $Pt^{4+}$ | $Rh^{3+}$ | $Ir^{3+}$ |
| Solution 1 | $H_2SO_4$ | HCl | $HNO_3$ | $H_2SO_4$ | HCl | $H_2SO_4$ | NaOH | $H_2SO_4$ | $H_2SO_4$ | HCl | HCl | HCl | HCl |
| pH | 2.4 | 0.4 | 0.3 | 3 | 0.9 | 2.5 | 11 | 3 | 0.6 | 1.2 | 0.0 | 1 | 0.0 |
| Measurement method | a | b | b | a | b | a | a | d | a | d | d | d | d |

| | Metal | | | | | | | | | | |
|---|---|---|---|---|---|---|---|---|---|---|---|
| | $Mo^{6+}$ | $V^{5+}$ | $Fe^{3+}$ (1) | $Fe^{3+}$ (2) | $Co^{2+}$ (1) | $Co^{2+}$ (2) | $Ni^{2+}$ (1) | $Ni^{2+}$ (2) | $Zn^{2+}$ (1) | $Zn^{2+}$ (2) | $Cd^{2+}$ |
| Solution 1 | $H_2SO_4$ | $H_2SO_4$ | $H_2SO_4$ | $H_2SO_4$ | $H_2SO_4$ | $H_2SO_4$ | $H_2SO_4$ | $H_2SO_4$ | $H_2SO_4$ | $H_2SO_4$ | $H_2SO_4$ |
| pH | 0.9 | 1.5 | 1 | 2.1 | 2 | 5 | 2 | 5 | 2 | 5 | 5 |
| Measurement method | c | a | a | a | a | a | a | a | a | a | a |

TABLE 5a

| | Metal | | | | | | | | | | | | |
|---|---|---|---|---|---|---|---|---|---|---|---|---|---|
| | $Se^{4+}$ | $Sb^{3/5+}$ | $Bi^{3+}$ | $Ge^{4+}$ | $Sn^{4+}$ | $Ga^{3+}$ (1) | $Ga^{3+}$ (2) | $In^{3+}$ | $Tl^{3+}$ | $Pd^{2+}$ | $Pt^{4+}$ | $Rh^{3+}$ | $Ir^{3+}$ |
| Resin (according to the invention) | Metal loading in g of metal/l | | | | | | | | | | | | |
| A | 19.7 | 113.8 | 123.8 | 44.6 | 115.2 | 46.1 | 29.3 | 58.3 | 39.4 | 133.9 | 131 | 35.5 | 67.7 |
| B | 16.0 | 95.1 | 95.9 | 33.2 | 98.4 | 35.3 | 21.7 | 47.6 | 34.0 | 109.1 | 107 | 31.2 | 63.6 |
| C | — | 107.5 | 121.9 | 43.7 | — | — | — | — | — | 119.0 | — | — | — |
| D | — | 72.0 | 0 | 53.7 | — | — | — | — | — | 13.4 | — | — | — |
| Comparison resin E | 12.4 | 41.5 | 39.7 | 13.0 | 57.7 | 13.6 | 8.7 | 19.5 | 22.3 | 38.4 | 40.0 | 12.7 | 39.7 |

TABLE 5b

| | Metal | | | | | | | | | | |
|---|---|---|---|---|---|---|---|---|---|---|---|
| | $Mo^{6+}$ | $V^{5+}$ | $Fe^{3+}$ (1) | $Fe^{3+}$ (2) | $Co^{2+}$ (1) | $Co^{2+}$ (2) | $Ni^{2+}$ (1) | $Ni^{2+}$ (2) | $Zn^{2+}$ (1) | $Zn^{2+}$ (2) | $Cd^{2+}$ |
| Resin (according to the invention) | Metal loading in g of metal/l | | | | | | | | | | |
| A | 220.9 | 51.5 | 37 | 42.2 | 14.4 | 37 | 17.3 | 38.9 | 12 | 45.6 | 57.1 |
| B | — | — | — | — | — | — | — | — | — | — | — |
| C | — | — | — | — | — | — | — | — | — | — | — |
| D | — | — | — | — | — | — | — | — | — | — | — |
| Comparison resin E | 77.5 | 22.6 | 11.8 | — | 3.4 | — | 13 | — | 4.0 | — | 9.0 |

Example 6

The re-extraction of some metals from resin A was measured in the following experimental arrangement:

The resin A loaded with metal according to Example 4 or Example 5 was filled into an exchanger column and washed with 200 ml of solution 1. The washing solution was discarded. The resin was then treated with 500 ml of solution 2 (re-extraction). The metal content of the solution running out was determined.

The degree of re-extraction in % is obtained from:

(g of re-extracted metal:absorbed metal) × 100.

The operation was carried out in downward flow at a running rate of 2–4 bed volumes per hour.

Table 6 shows the results.

TABLE 6

| Metal | Solution 1 | Solution 2 | Degree of re-extraction % |
|---|---|---|---|
| $Cu^{2+}$ | pH 4 | 2M $H_2SO_4$ | 100 |
| $Zn^{2+}$ | pH 5 | 2M $H_2SO_4$ | 89 |
| $Cd^{2+}$ | pH 5 | 2M $H_2SO_4$ | 87.5 |
| $Fe^{3+}$ | pH 2 | 3M $H_2SO_4$ | 92.4 |
| $Co^{2+}$ | pH 5 | 2M $H_2SO_4$ | 62.4 |
| $Ni^{2+}$ | pH 5 | 2M $H_2SO_4$ | 80.8 |
| $Sb^{3+/5+}$ | 1.5M HCl | 4M NaOH | 42.7 |
| $Bi^{3+}$ | pH 0.3 | 5M $H_2SO_4$ | 97 |
| $Ga^{3+}$ | pH 2.5 | 2M $H_2SO_4$ | 88.6 |
| $In^{3+}$ | pH 3 | 2M $H_2SO_4$ | 100 |
| $Sn^{4+}$ | 0.5M HCl | 1M NaOH | 75.1 |
| $Ge^{+}$ | pH 3.5 | 3M KOH | 91 |
| $Mo^{6+}$ | pH 1.0 | 2M NaOH | 100.0 |
| $V^{5+}$ | pH 2 | 2M $H_2SO_4$ | 98.3 |
| $Pd^{2+}$ | 0.1M HCl | 8M HCl | 84.5 |

Example 7

The effect of the pH value on the absorption of some metal ions by a resin was measured in the following experimental arrangement:

Such a quantity of moist resin as contains 1 g of dry resin matter was pretreated as described in Example 4. After the neutral washing, the resin was transferred into a round-bottomed flask. 100 ml of an aqueous solution having a concentration of 0.5M of $NaClO_4$ and 0.001M of the metal ion to be determined were added to the resin. The desired pH value is adjusted with sodium hydroxide solution, sulfuric acid or acetate buffer, the suspension is stirred for 24 hours, the pH value is measured again and the resin is filtered off with suction. The percentage of the quantity of metal employed and absorbed by the resin is determined by titration or atomic absorption spectroscopy measurement.

Figure 1F:
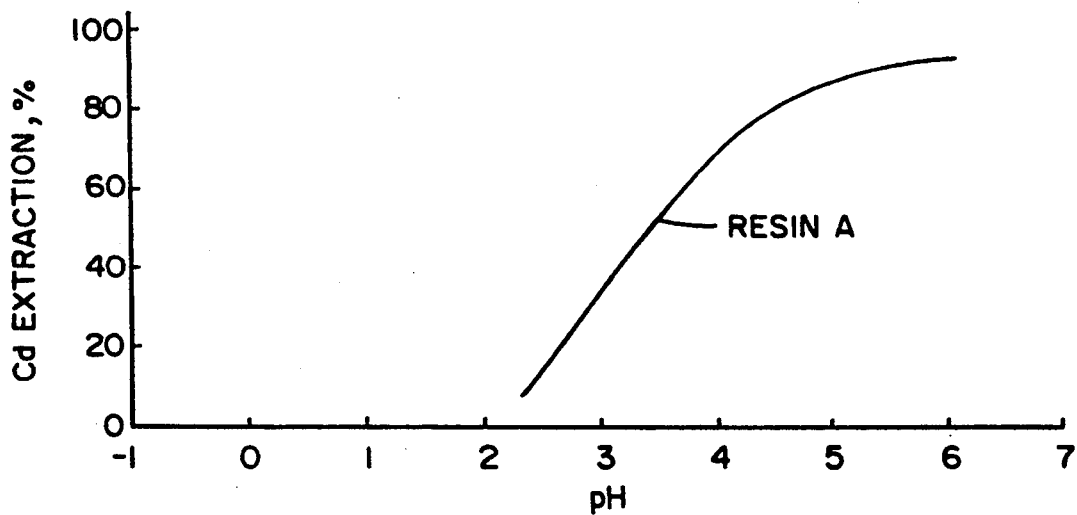
FIG. 1f is identical to FIG. 1a except that cadmium extraction, rather than gallium extraction, is depicted. Moreover, resin E wax not tested in this extraction experiment.

FIGS. 1a to 1f graphically depict percent extraction of gallium, copper, iron, zinc, nickel and cadmium, respectively, using resin A of the present invention, as defined above, as a function of pH. In addition, each of FIGS. 1ato 1f, except FIG. 1f, depicts the same result utilizing resin E of the prior art, as defined above, for comparison purposes. In accordance with this example, the graphical depictions relate to use of one gram of dry resin in 100 ml of 0.5 $NaClO_4$ and 0.001M of the metal ion.

Example 8

The stability of resin A towards acids and bases was measured in the following experimental arrangement:

The quantity of moist resin corresponding to 5 g of dry resin matter was filled without bubbles into an exchanger column secured against running dry. The following operations 1–5 were carried out successively in downward flow at a running rate of about 2 bed volumes per hour.

1. The resin was washed with 100 ml of 2M $H_2SO_4$ and then with 500 ml of water. The washing solutions were discarded.
2. 110 ml of copper sulfate solution (6 g/l of $Cu^{2+}$; pH 1.8) were allowed to run over the resin, and the latter was rinsed with 390 ml of water. The solutions running out were combined and the Cu content of the solutions running in and out was determined. The difference gave the copper absorption by the resin.
3. The resin thus loaded with copper was treated with 500 ml of 2M $H_2SO_4$ (Cu re-extraction). The copper content in the eluate running out was determined. The degree of re-extraction was calculated as indicated in Example 6.
4. For several weeks, the resin was treated with in each case 500 ml of 4N $H_2SO_4$ and 500 ml of 2N NaOH in daily alternation.
5. The determination of the copper absorption and of the degree of re-extraction was repeated and compared with the copper absorption measured in the first cycle. Inadequate chemical stability of the resin would manifest itself in a decrease in the copper absorption.

Figure 2A:
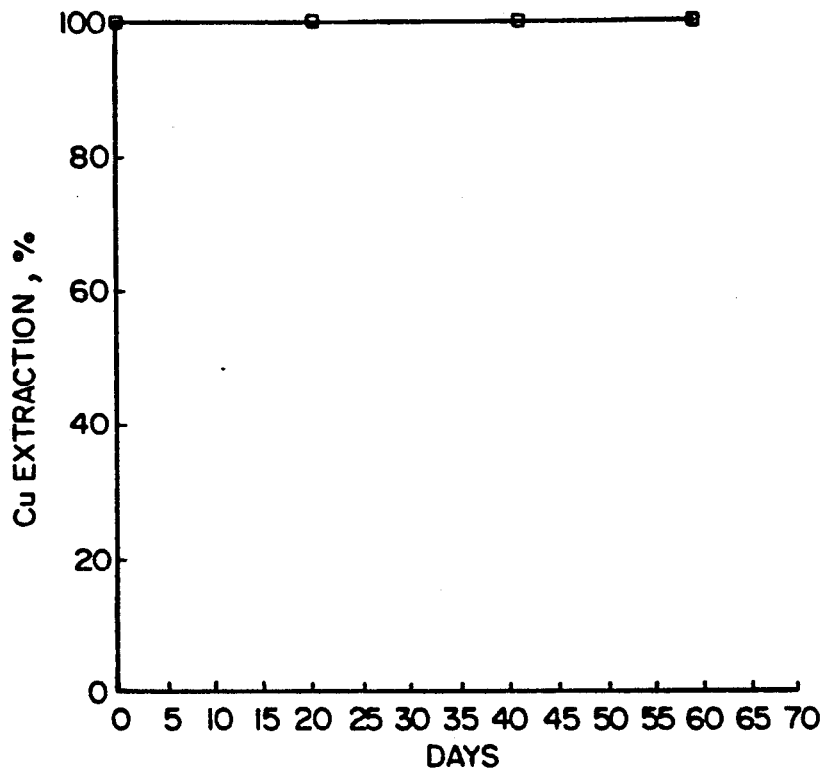
FIG. 2a is a graphical representation of the stability, in Example 8, of resin A to sulfuric acid and sodium hydroxide as manifested by percent copper absorbed by resin A.
Figure 2B:
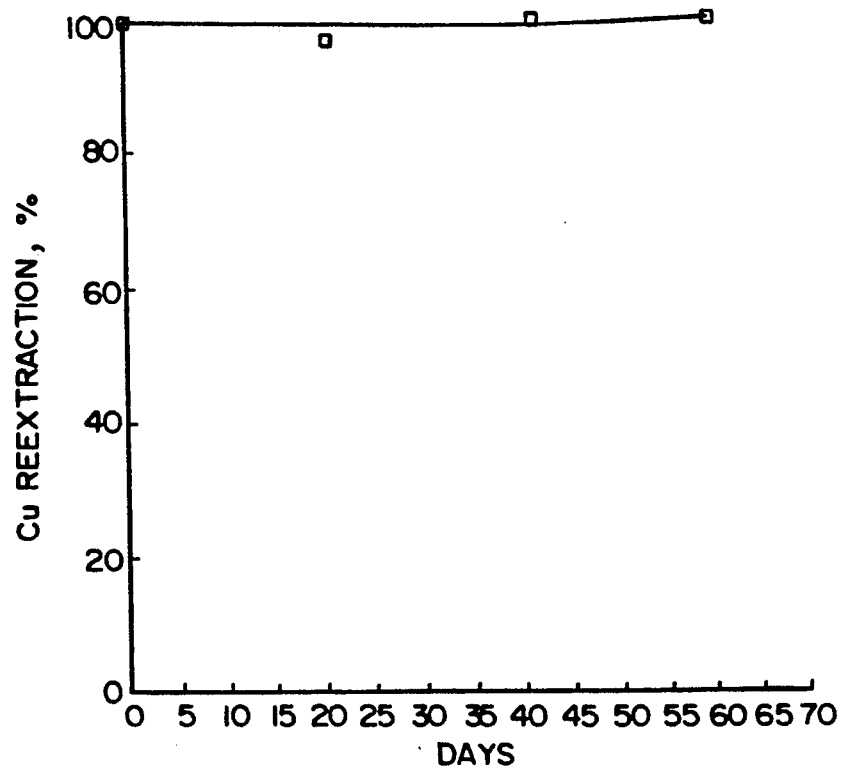
FIG. 2b is a graphical representation of the stability, in Example 8, of resin A to sulfuric acid and sodium hydroxide as manifested by percent copper reextracted by resin A.

FIG. 2a depicts the stability of Resin A to 4N sulfuric acid and 2N sodium hydroxide as manifested by percent copper loading, as a function of time, of five grams of dry resin at a pH of 1.8. FIG. 2b graphically depicts the stability of Resin A to 4N sulfuric acid and 2N sodium hydroxide as manifested by copper reextracted from loaded resin A as a function of time.

We claim:

1. A process for the extraction of metals comprising extracting metal ions from an aqueous solution by passing said solution through an ion exchange resin, said ion exchange resin prepared by a process which includes the steps of (a) preparing a carrier material by amidoalkylation or imidoalkylation of a crosslinked styrene copolymer with an ester or an ether of an N-hydroxyalkylimide followed by subsequent hydrolysis of the amido- or imido-alkylation product; (b) reacting said carrier material with an aldehyde and 8-hydroxyquinoline and/or an 8-hydroxy-quinoline derivative and, optionally, a swelling agent and/or a solvent, said reaction occurring at a temperature of between 20° C. and 100° C.; and (c) washing the reaction product of step (b) with water and, optionally, an acid or a base and/or a solvent.

2. A process in accordance with claim 1 wherein said carrier material includes at least one reactive group having the structural formula —$(CH_2)_n$—NH—$R^1$, where $R^1$ is hydrogen, alkyl, cycloalkyl or an alicyclic radical containing 1 to 10 carbon atoms, unsaturated alkyl, unsaturated cycloalkyl or an unsaturated alicyclic radical containing 1 to 10 carbon atoms, substituted alkyl, substituted cycloalkyl or a substituted alicyclic radical containing 1 to 10 carbon atoms, an aromatic radical containing 6 to 10 carbon atoms or a substituted aromatic radical containing 6 to 10 carbon atoms; and n is 1 or 2.

3. A process in accordance with claim 2 wherein $R^1$ is hydrogen or methyl.

4. A process in accordance with claim 1 wherein said carrier material formed in step (a) is a macroporous aminomethylated styrene-divinylbenzene copolymer.

5. A process in accordance with claim 1 wherein said reaction of step (b) occurs at a temperature in the range of 50° C. to 70° C.

6. A process in accordance with claim 1 wherein said aldehyde, reacted with said carrier material in step (b), has the structural formula

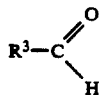

where $R^3$ is hydrogen, $C_1$–$C_4$ alkyl, an aromatic hydrocarbon radical having 6 to 10 carbon atoms or a substituted aromatic hydrocarbon radical having 6 to 10 carbon atoms.

7. A process in accordance with claim 6 wherein $R^3$ is hydrogen methyl or ethyl.

8. A process in accordance with claim 7 wherein said aldehyde is formaldehyde.

9. A process in accordance with claim 1 wherein said swelling agent and/or solvent reactant of said step (b) is water and, optionally, methanol and/or ethanol.

10. A process in accordance with claim 1 wherein said metal ions extracted are platinum and palladium.

* * * * *

UNITED STATES PATENT AND TRADEMARK OFFICE
CERTIFICATE OF CORRECTION

PATENT NO. : 5,290,453
DATED : March 1, 1994
INVENTOR(S) : Michael Richter, et al.

Page 1 of 2

It is certified that error appears in the above-indentified patent and that said Letters Patent is hereby corrected as shown below:

Column 1, line 37: "resins/" should read --resins.--
Column 3, line 45: after "preferred" insert --.--
Column 4, line 11: "N-hydroalkylimides" should read --N-hydroxyalkylimides--
Column 5, line 26: after "$C_4$" insert --alcohols--
Column 5, line 41: "CH" should read --OH--
Column 6, line 24: delete "temperature."
Column 6, line 59: after "solution" insert --.--
Column 8, line 6, Table 2: "Ad" should read --Aa--
Column 8, line 52: "$Cu^2+$))" should read --$Cu^2+$)--

UNITED STATES PATENT AND TRADEMARK OFFICE
CERTIFICATE OF CORRECTION

PATENT NO. : 5,290,453
DATED : March 1, 1994
INVENTOR(S) : Michael Richter, et al.

It is certified that error appears in the above-indentified patent and that said Letters Patent is hereby corrected as shown below:

Column 11, line 57: "lato" should read --la to--

Signed and Sealed this

Twenty-seventh Day of December, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,290,453
DATED : March 1, 1994
INVENTOR(S) : Michael Richter, et al.

It is certified that error appears in the above-indentified patent and that said Letters Patent is hereby corrected as shown below:

On the Title Page, Section [73]: "Schering Aktiengesellschaft" should read --Witco GmbH--

Column 1, line 37: "resins/" should read --resins.--

Column 3, line 45: after "preferred" insert --.--

Column 4, line 11: "N-hydroalkylimides" should read --N-hydroxyalkylimides--

Column 5, line 26: after "$C_4$" insert --alcohols--

Column 5, line 41: "CH" should read --OH--

Column 6, line 24: delete "temperature."

UNITED STATES PATENT AND TRADEMARK OFFICE
CERTIFICATE OF CORRECTION

PATENT NO. : 5,290,453
DATED : March 1, 1994
INVENTOR(S) : Michael Richter, et al.

It is certified that error appears in the above-indentified patent and that said Letters Patent is hereby corrected as shown below:

Column 6, line 59: after "solution" insert --.--

Column 8, line 6, Table 2: "Ad" should read --Aa--

Column 8, line 52: "$Cu^2+))$" should read --$Cu^2+)$--

Column 11, line 57: "lato" should read --la to--

Signed and Sealed this

Eleventh Day of April, 1995

BRUCE LEHMAN

Attest:

Attesting Officer    Commissioner of Patents and Trademarks